United States Patent
Bharani et al.

(10) Patent No.: US 8,251,168 B2
(45) Date of Patent: Aug. 28, 2012

(54) AIR COOLING SYSTEM INCLUDING AIRFLOW DEFLECTOR FOR ELECTRIC DRIVE MACHINE

(75) Inventors: Sanjeev Bharani, Normal, IL (US); Cameron T. Lane, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 1001 days.

(21) Appl. No.: 12/286,589

(22) Filed: Oct. 1, 2008

(65) Prior Publication Data
US 2010/0079946 A1    Apr. 1, 2010

(51) Int. Cl.
*B60K 11/06* (2006.01)
*H02K 9/02* (2006.01)

(52) U.S. Cl. ......................................... 180/68.1; 310/59

(58) Field of Classification Search ................. 180/65.1, 180/65.4, 68.1, 68.2, 65.51; 310/52, 59, 310/61, 64, 54, 58; 165/41, 80.3, 129, 143, 165/174, 184
See application file for complete search history.

(56) References Cited

U.S. PATENT DOCUMENTS

| | | | |
|---|---|---|---|
| 2,214,592 A * | 9/1940 | Mueller ..................... 310/60 R |
| 3,301,357 A * | 1/1967 | Cussons et al. ............ 188/264 R |
| 3,451,469 A * | 6/1969 | Hall et al. ......................... 165/41 |
| 3,590,290 A | 6/1971 | Ruelle et al. |
| 3,610,976 A | 10/1971 | Wightman |
| 4,409,502 A | 10/1983 | McCabria |
| 4,465,948 A | 8/1984 | Oyama et al. |
| 4,496,863 A | 1/1985 | Sawatani |
| 4,719,361 A * | 1/1988 | Brubaker ........................ 290/45 |
| 4,859,887 A | 8/1989 | Carlsson et al. |
| 5,019,737 A | 5/1991 | Bruno |
| 5,223,757 A | 6/1993 | Staub et al. |
| 5,747,900 A | 5/1998 | Nakamura et al. |
| 5,780,946 A | 7/1998 | Nakamura et al. |
| 5,814,908 A | 9/1998 | Muszynski |
| 5,898,246 A | 4/1999 | Hoffman |
| 6,087,744 A | 7/2000 | Glauning |
| 6,148,940 A * | 11/2000 | Hokanson et al. ......... 180/65.51 |
| 6,215,212 B1 | 4/2001 | Grennan et al. |
| 6,703,730 B2 | 3/2004 | Hayashi |
| 6,837,322 B2 | 1/2005 | Jurado et al. |
| 7,009,317 B2 | 3/2006 | Cronin et al. |
| 7,315,099 B2 * | 1/2008 | Steffen et al. .............. 180/65.51 |
| 7,633,193 B2 * | 12/2009 | Masoudipour et al. ......... 310/54 |
| 7,683,510 B2 * | 3/2010 | Pellegrino ........................ 310/58 |
| 7,992,663 B2 * | 8/2011 | Hill et al. ..................... 180/68.1 |
| 2002/0163258 A1 | 11/2002 | Lynch |
| 2004/0036367 A1 | 2/2004 | Denton et al. |
| 2006/0226717 A1 | 10/2006 | Nagayama et al. |

* cited by examiner

Primary Examiner — Lesley D Morris
Assistant Examiner — Daniel Yeagley
(74) Attorney, Agent, or Firm — Liell & McNeil

(57) ABSTRACT

An electric drive machine includes an axle assembly having a central axle housing. An electric drive motor, having a motor housing, is oriented along an axis and disposed within the central axle housing. An air cooling system includes a blower fluidly connected to and positioned upstream of an opening of the central axle housing. An airflow path through the central axle housing includes an upstream segment and a downstream segment. The upstream segment extends from the opening to an airflow deflector, and is configured for airflow in a first direction along an axial path. The downstream segment extends from the airflow deflector to the motor housing, and is configured for airflow in a second direction, which is opposite the first direction, along a helical path.

20 Claims, 5 Drawing Sheets

AIR COOLING SYSTEM INCLUDING AIRFLOW DEFLECTOR FOR ELECTRIC DRIVE MACHINE

TECHNICAL FIELD

The present disclosure relates generally to an air cooling system for an electric drive machine, and more particularly to a system and method for cooling an electric drive motor of the electric drive machine.

BACKGROUND

Electric drive systems for large off-highway machines, such as mining trucks, typically include an alternator, or other electrical power generator, driven by an internal combustion engine. The alternator, in turn, supplies electrical power to a pair of electric drive motors connected to wheels of the machine. It should be appreciated that a significant amount of heat is generated during the operation of the electric drive system. Specifically, the alternator and the electric drive motors, along with various other electrical components, may generate a significant amount of heat and, as such, require cooling to prevent damage or failure. However, cooling of these components provides significant challenges due to space limitations, the relative positioning of each of the components, and the amount of cooling that is required.

U.S. Pat. No. 6,837,322 teaches a ventilation system for an electric drive vehicle utilizing a single centrifugal blower for cooling an alternator, a drive motor, and a control group component. Specifically, the blower is driven by the alternator and is configured to accelerate air in both a radial direction and an axial direction. At least one opening is formed in a perimeter portion of a housing of the blower for receiving the radial airflow, and at least one opening is formed in a side portion of the housing for receiving the axial airflow. Air is routed from these openings to each of the alternator, drive motor, and control group. Although this ventilation system may provide sufficient cooling for an electric drive machine having a specific configuration, it should be appreciated that a variety of electric drive systems exist, each having a unique configuration and, as such, being subject to unique requirements and spatial constraints. As a result, there is a continuing need for cooling systems having efficient designs that fit within limited space constraints of a machine and, further, provide reduced weight and cost. Further, there is a need for cooling systems having reduced pressure losses and more evenly distributed cooling flow in specific components, such as the electric drive motors.

The present disclosure is directed to one or more of the problems set forth above.

SUMMARY OF THE DISCLOSURE

In one aspect, an electric drive machine includes an axle assembly having a central axle housing. An electric drive motor, having a motor housing, is oriented along an axis and disposed within the central axle housing. An air cooling system includes a blower fluidly connected to and positioned upstream of an opening of the central axle housing. An airflow path through the central axle housing includes an upstream segment and a downstream segment. The upstream segment extends from the opening to an airflow deflector, and is configured for airflow in a first direction along an axial path. The downstream segment extends from the airflow deflector to the motor housing, and is configured for airflow in a second direction, which is opposite the first direction, along a helical path.

In another aspect, a method of cooling an electric drive motor of an electric drive machine includes a step of directing airflow through a central axle housing of the electric drive machine from an airflow inlet to an airflow deflector in a first direction along an axial path. The method also includes a step of redirecting the airflow from the airflow deflector through a motor housing in a second direction, which is opposite the first direction, along a helical path.

In yet another aspect, an airflow deflector subassembly for a cooling system of an electric drive machine includes an annular body having a concave deflection surface. The annular body defines a central opening for receiving an axle shaft, which is oriented along an axis, therethrough. A plurality of directional vanes extend from the concave deflection surface and are oriented along planes that are substantially perpendicular to an axis.

In yet another aspect, an electric drive machine includes an axle assembly having a central axle housing. An electric drive motor, including a motor housing, is oriented along an axis and disposed within the central axle housing. An air cooling system includes a blower fluidly connected to and positioned upstream of an opening of the central axle housing. An airflow deflector subassembly is positioned within an internal space of the axle assembly and includes an annular body having a concave deflection surface. The annular body defines a central opening for receiving an axle shaft, which is oriented along the axis, of the electric drive machine therethrough. A plurality of directional vanes extend from the concave deflection surface and are oriented along planes that are substantially perpendicular to the axis.

DETAILED DESCRIPTION

Figure 1:
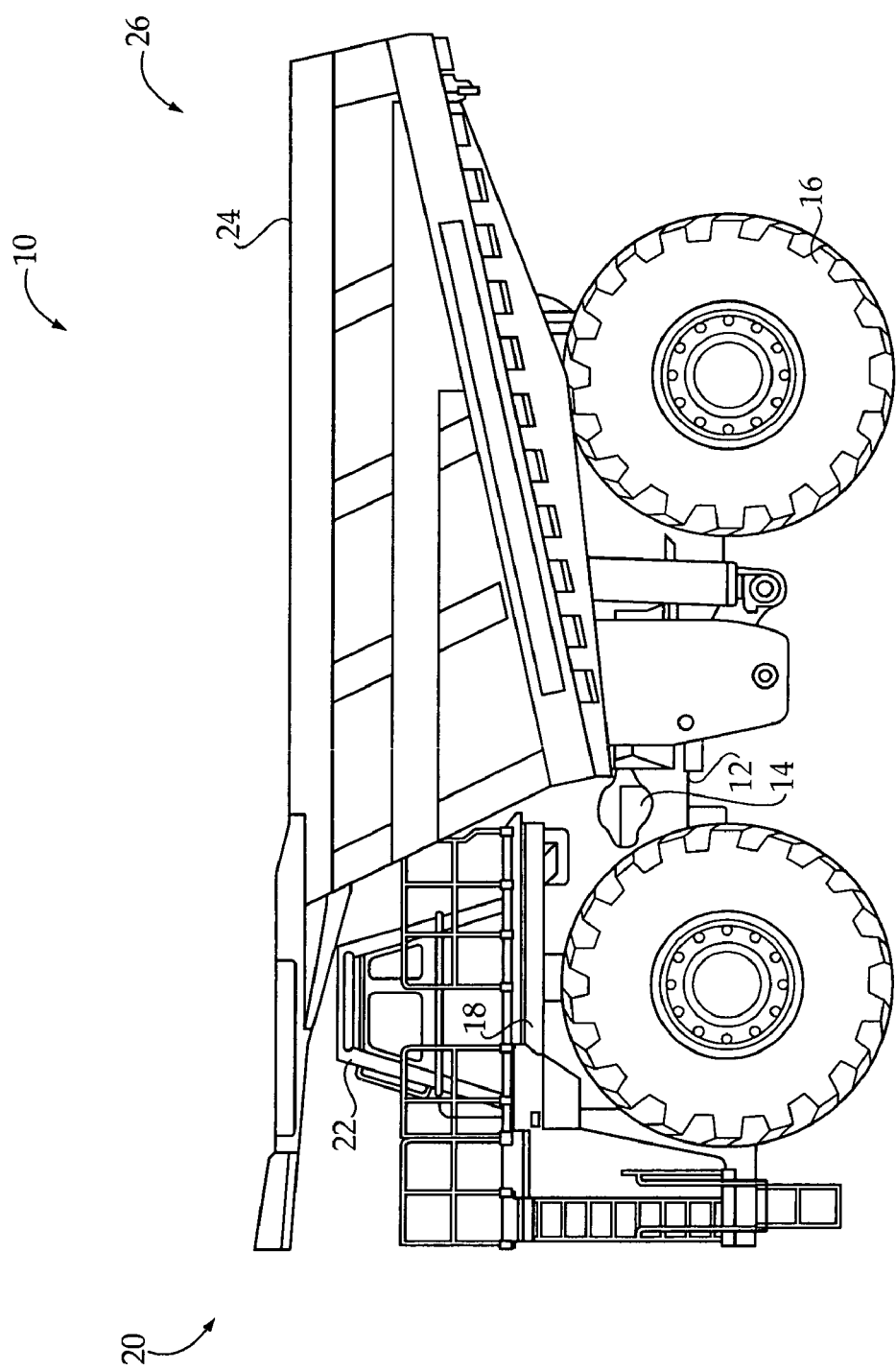
FIG. 1 is a side diagrammatic view of an electric drive machine, according to the present disclosure.

An exemplary embodiment of a machine 10 is shown generally in FIG. 1. The machine 10 may be a mining truck, as shown, or any other off-highway or on-highway vehicle having an electric drive propulsion system. As such, machine 10 may also be referenced herein as an electric drive machine. In the illustrated embodiment, machine 10 generally includes a frame 12 having an electric drive propulsion system 14, discussed later in greater detail, supported thereon for driving wheels of the machine, such as, for example, rear wheels 16 (only one of which is shown). The frame 12 may also support a platform 18 positioned at a front end 20 of the machine 10 and having an operator control station 22 mounted thereon. A dump body 24 is pivotally mounted on the frame 12, at a rear end 26 of the machine 10, such that the dump body 24 is movable between a hauling position, as shown, and a dumping position.

Figure 2:
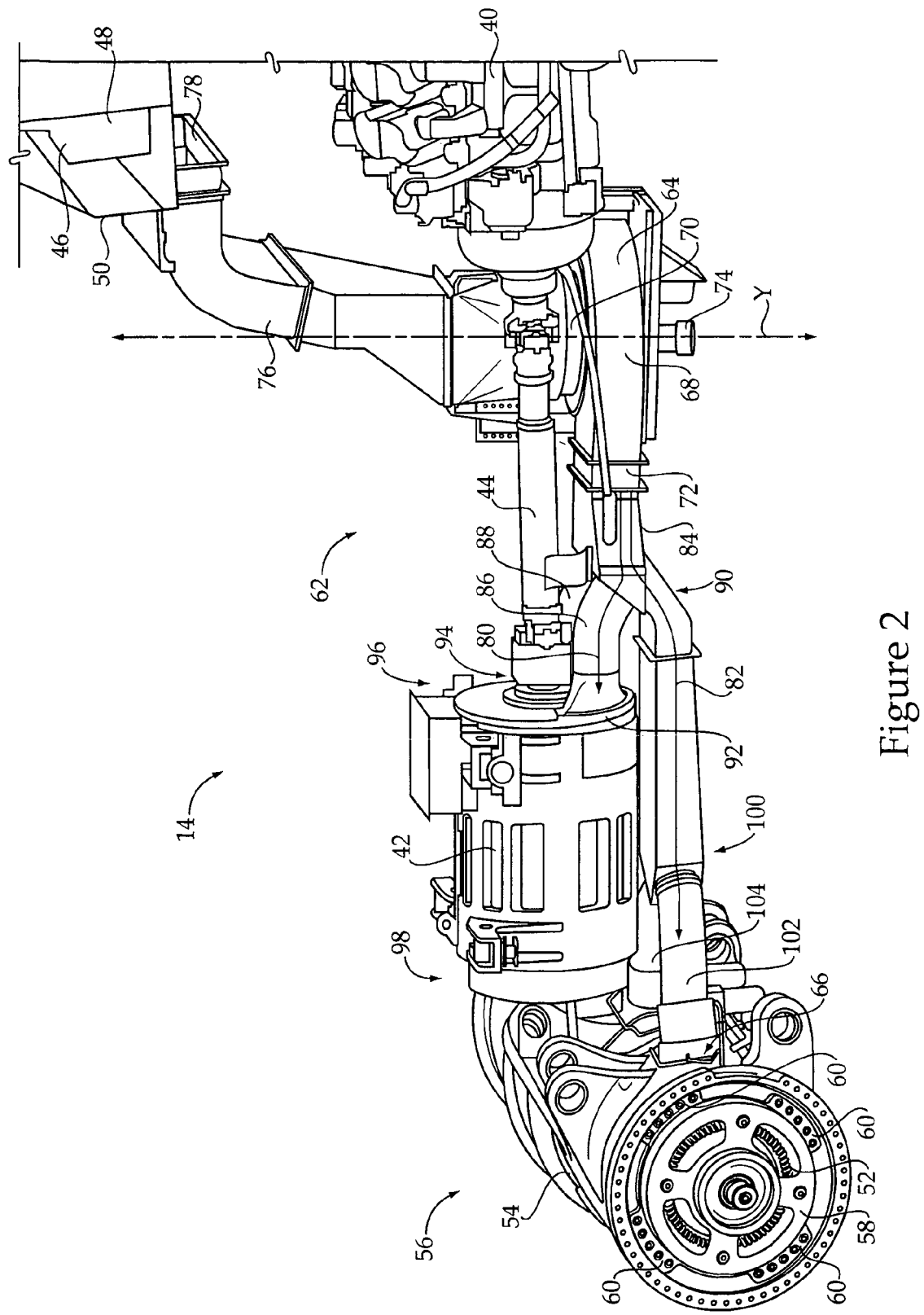
FIG. 2 is a perspective view of an electric drive propulsion system of the electric drive machine of FIG. 1, including an air cooling system therefor.

As shown in FIG. 2, the electric drive propulsion system 14 may generally include an internal combustion engine 40, such as, for example, a compression or spark-ignited engine, that provides mechanical power to an electrical power generator 42, such as, for example, an alternator. As shown in the illustrated embodiment, the electrical power generator 42 may be remotely coupled to the internal combustion engine 40, such as through a drive shaft 44. According to one embodiment, the electrical power generator 42 may be mounted to the frame 12 (FIG. 1), rather than directly to or in close proximity to the internal combustion engine 40, to more evenly distribute weight across the frame 12 of the machine 10. Alternatively, however, the electrical power generator 42 may be belt-driven or directly attached to the internal combustion engine 40, as is well known in the art. The electrical power generator 42, in turn, may produce electrical power, such as, for example, an alternating electrical current.

It should be appreciated that one or more rectifiers (not shown) may also be used to convert the alternating electrical current to a direct electrical current, as necessary. Alternatively, however, a direct electrical current may be produced and converted to an alternating electrical current, using an inverter 46. According to one embodiment, the electrical power generator 42 may be electrically connected to an electrical components system 48 that may include the inverter 46. The inverter 46, along with other electrical components of the electrical components system 48, may be positioned within an inverter cabinet 50, or other suitable housing. Referring also to FIG. 1, the inverter cabinet 50 may be supported on the platform 18 of the machine 10 and, further, may be positioned adjacent the operator control station 22.

The inverter 46 may condition the electrical power produced by the electrical power generator 42 to provide a voltage and current sufficient to power one or more motors, such as, for example, a pair of electric drive motors 52 (only one of which is shown). According to one example, the inverter 46 may modulate the frequency of the power produced by the electrical power generator 42 to control the speed of the pair of electric drive motors 52. The electric drive motors 52 may be, for example, wheel motors used to power rear wheels 16, shown in FIG. 1, to propel the machine 10.

As shown, the electric drive motors 52 may be disposed within a central axle housing 54 of an axle assembly, such as a rear axle assembly 56. Further, each of the electric drive motors 52 may be disposed within a motor housing 58, which is disposed within the central axle housing 54. According to one embodiment, one or both of the motor housing 58 and the central axle housing 54 may include a plurality of attachment flanges 60 for mounting the motor housing 58 and, thus, the motor 52 within the central axle housing 54. Specifically, attachment flanges 60 of motor housing 58 may include one or more mounting bores for receiving fasteners, such as bolts, therethrough. Although a specific mounting arrangement is shown, alternative mounting arrangements are also contemplated. In addition, the central axle housing 54 may support other known components, such as, for example, a spindle, wheel, and final drive, all of which have been removed for illustrative purposes.

The machine 10 may also include an air cooling system, referenced generally at 62, for cooling the components of the electric drive propulsion system 14. The air cooling system 62 may generally include a blower 64 fluidly connected, such as through ductwork, to the electrical components system 48, the electrical power generator 42, and the pair of electric drive motors 52. For example, the blower 64 may be fluidly connected to the central axle housing 54, such as through an opening 66, which may serve as an airflow inlet. According to a specific embodiment, the blower 64 may be a centrifugal blower and may include an impeller rotatable about an axis Y. The blower 64 may also include a blower housing 68 having an axially positioned inlet 70 and a radially positioned outlet 72.

During operation, the blower 64 may be configured to draw ambient air through the axially positioned inlet 70 in a direction that is substantially parallel to axis Y. The ambient air that is drawn into the blower 64 may be pressurized, in a well known manner, and directed through the radially positioned outlet 72 in a direction substantially perpendicular to axis Y. According to one embodiment, the blower 64 may be powered by a hydraulic motor 74, receiving its power from a hydraulic pump (not shown) connected to the internal combustion engine 40. However, alternative means for operating the blower 64 are known and are also contemplated for use with the air cooling system 62.

An inlet duct 76, which may be manufactured from a metal or flexible material, may fluidly connect the blower 64 to both of the inverter cabinet 50, described above, and an ambient air passage 78, which may receive ambient air directly from the atmosphere. According to a specific embodiment, the inlet duct 76 may receive ambient air through one or both of the inverter cabinet 50 and the ambient air passage 78. It should be appreciated that the ambient air passage 78 may be positioned above the platform 18 at the front end 20 of the machine 10 (FIG. 1). As such, it should also be appreciated that the ambient air drawn through the ambient air passage 78 may be substantially unobstructed, and may provide an airflow into the inlet duct 76 that is not heated by the electrical components system 48.

Since the inverter cabinet 50 is positioned upstream of the blower 64, the electrical components system 48 housed therein may be cooled using ambient air drawn through the inverter cabinet 50 by the blower 64. It should also be appreciated that the ambient air drawn through the inverter cabinet 50 may become heated as it passes over the electrical components system 48. This heated air may be combined with the ambient air provided directly from the atmosphere through the ambient air passage 78, as described above, and pressurized by the blower 64.

The pressurized ambient air, or airflow, may be directed, from the blower 64, through one or more outlet ducts, or other fluid passages, to cool the electrical power generator 42 and the electric drive motors 52. According to one embodiment, the pressurized ambient air may travel along a first path 80 to cool the electrical power generator 42 and a second path 82 to cool the electric drive motors 52. It should be appreciated that the electrical power generator 42 and the electric drive motors 52, according to the illustrated embodiment, may be fluidly in parallel, i.e., both components receive pressurized ambient air along paths 80 and 82 that may be substantially parallel or inclined toward one another. Initially, however, both of the first and second paths 80 and 82 may be directed through a common passage or, according to the exemplary embodiment, an intermediate duct 84.

The intermediate duct 84, designed to provide a required flow split of airflow between the electrical power generator 42 and the electric drive motors 52, may be fluidly connected to the electrical power generator 42 through at least two airflow passages, or ducts, 86 and 88. Airflow passages 86 and 88 may extend from a first end 90 of the intermediate duct 84 and terminate in two quadrants 92 and 94 at a first end 96 of the electrical power generator 42. According to the illustrated embodiment, the airflow passages 86 and 88 may direct pressurized ambient air, or airflow, toward two lower quadrants 92 and 94 of the electrical power generator 42. However, it should be appreciated that one or more passages may be provided to direct pressurized ambient air toward any portion of the electrical power generator 42. The pressurized ambient air, passing through and cooling the electrical power generator 42, may be exhausted through a second end 98 of the electrical power generator 42.

A second end 100 of the intermediate duct 84 may be fluidly connected to the central axle housing 54 through at least two airflow passages, or ducts, 102 and 104. Although two airflow passages 102 and 104 are shown, it should be appreciated that any number of airflow passages may be used to direct pressurized air toward the electric drive motors 52. According to the illustrated embodiment, each of the airflow passages 102 and 104 may be directed toward one of the pair of electric drive motors 52. According to one embodiment, it may be desirable to dimension the intermediate duct 84 so that a cross sectional area of the second end 100 is greater than a cross sectional area of the first end 90. As such, the pressurized ambient air may maintain sufficient pressure as it diverges through the airflow passages 102 and 104.

Figure 3:
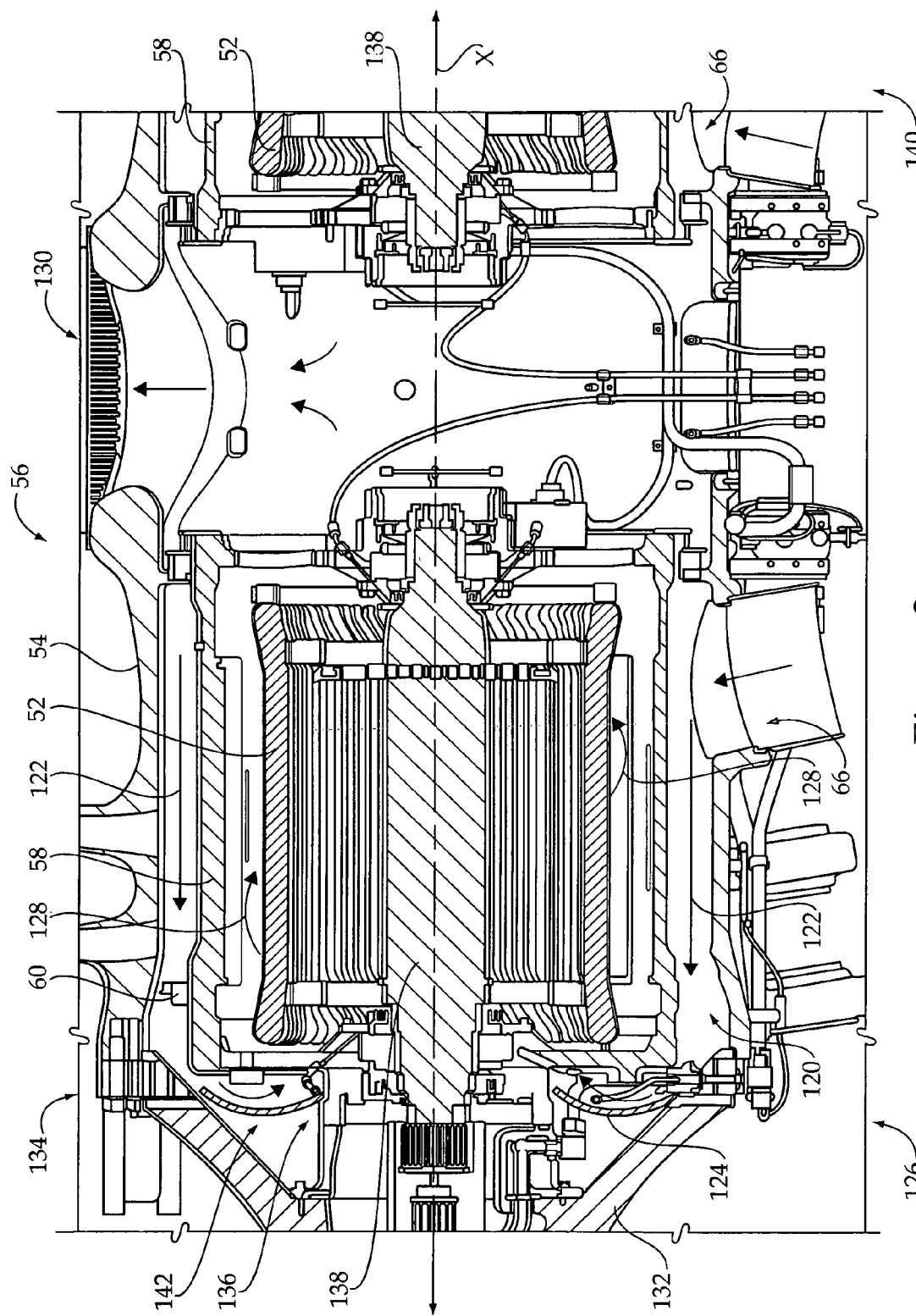
FIG. 3 is a side diagrammatic view, in cross section, of a rear axle assembly of the electric drive machine of FIG. 1.

From airflow passages 102 and 104, the pressurized ambient air, or airflow, may pass into the central axle housing 54 through one or more airflow inlets 66. As shown in FIG. 3, the airflow may then travel through the central axle housing 54 along an airflow path, designated generally at 120. The airflow path 120 may include an upstream segment 122 extending from the airflow inlet 66, or opening, to an airflow deflector 124, discussed below in greater detail. The upstream segment 122, having a position between the motor housing 58 and the central axle housing 54, may be configured for airflow in a first direction along an axial path. More specifically, electric drive motor 52, housed within motor housing 58, may be oriented along an axis, such as an axis X, which may be substantially horizontal. As a result of the orientation, airflow entering the central axle housing 54, may be deflected by the motor housing 58 and directed toward an end, such as a first end 126, of the central axle housing 54 along a path that is substantially parallel to axis X.

The airflow path 120 may also include a downstream segment 128 extending from the airflow deflector 124 and through the motor housing 58. The downstream segment 128, as a result of a specific configuration of the airflow deflector 124, discussed below, may be configured for airflow in a second direction, which may be opposite the first direction, along a helical path. Specifically, the downstream segment 128 may be configured for airflow that is directed away from the airflow deflector 124 in a direction that is offset, such as, for example, by 180°, from the travel direction of airflow along the upstream segment 122. A "helical" path, as induced by the airflow deflector 124, may broadly reference an airflow path that is not substantially axial, but includes, at least some degree of, rotation. After passing through the motor housing 58, and cooling the electric drive motor 52, the airflow may be deflected off various internal surfaces of the central axle housing 54 and, ultimately, exhausted through an airflow outlet 130 of the central axle housing 54.

The rear axle assembly 56 may also include a spindle 132 having an external connection 134 to the central axle housing 54 and an internal connection 136 to the motor housing 58, as shown. It should be appreciated that the spindle 132 may support, or at least partially support, one or both of a wheel and final drive, as referenced above. More specifically, the electric drive motor 52 may drivingly engage an axle shaft 138, which, in turn, drives the wheel and/or final drive. Such components, as referenced herein, are known and are only peripherally within the scope of the present disclosure. As a result, such components will not be discussed herein in greater detail. Further, although only the first end 126 of the central axle housing 54 is described, it should be appreciated that a second, or opposing, end 140 may represent a mirror image of the first end 126. Specifically, the second end 140 of the central axle housing 54 may also include an electric drive motor 52 positioned within a motor housing 58 and cooled using the strategy provided herein.

The airflow deflector 124, according to the exemplary embodiment, may be positioned between the internal connection 136 and the external connection 134. More specifically, the airflow deflector 124 may be positioned within an internal space 142 defined by the internal connection 136 and the external connection 134 of spindle 132. As a result, the airflow deflector 124 may prevent significant pressure losses that may occur from airflow recirculation and being deflected off one or more surfaces defining the internal space 142 before being directed, or redirected, through the motor housing 58.

Figure 4:
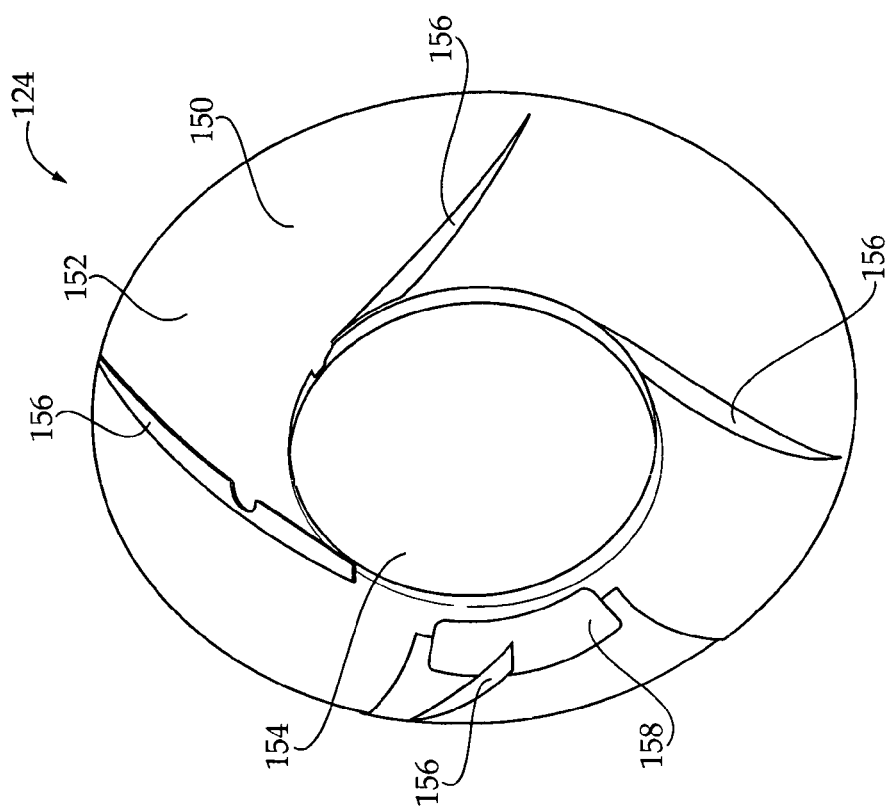
FIG. 4 is a perspective view of an airflow deflector, according to the present disclosure.

Turning now to FIG. 4, the airflow deflector 124, or airflow deflector subassembly, is shown in greater detail. The airflow deflector 124, which may be manufactured from a metal, such as a sheet metal, or a molded plastic capable of withstanding high temperatures, may generally include an annular body 150 having a concave deflection surface 152. The annular body 150 may define a central opening 154 for receiving an axle shaft, such as axle shaft 138, of the electric drive machine 10 therethrough. At least four directional vanes 156 may extend from the concave deflection surface 152 and may be oriented along planes that are substantially perpendicular to axis X of FIG. 3. It should be appreciated that the concave deflection surface 152, which may receive airflow from the upstream segment 122, may be shaped to provide a 180°, or similar, deflection. Further, each of the four directional vanes 156 may be positioned to direct airflow toward a quadrant opening of the electric drive motor 52. Specifically, the directional vanes 156 may be positioned to induce rotation of the airflow about axis X. Therefore, the airflow deflector 124 may both redirect airflow in a different direction, such as an opposite direction, and induce a direction of rotation of the airflow about axis X.

The airflow deflector 124, or airflow deflector subassembly, may be manufactured as an insert and, as such, may include one or more attachment features. Specifically, the airflow deflector 124 may include any known features useful for attaching the airflow deflector 124 to the rear axle assembly 56. According to one embodiment, the airflow deflector 124 may include attachment features for attaching the annular body 150 to the spindle 132, adjacent one or both of the internal connection 136 and the external connection 134. More specifically, the airflow deflector 124, or a mounting flange thereof, may include one or more fastener openings, such as holes, grooves, slots, or other similar structures for receiving suitable mounting fasteners. Such fasteners may include appropriate bolts, screws, anchors, clamps, clips, and the like. Alternatively, the airflow deflector 124 may be welded or otherwise fixedly attached within the rear axle assembly 56. Yet alternatively, the airflow deflector 124 may be an integral part of the rear axle assembly 56, or various assemblies of the rear axle assembly 56. As should also be appreciated, the annular body 150 of the airflow deflector 124 may include alternative configurations based on specific requirements, such as spatial constraints, of a particular application. For example, the annular body 150 may include a fluid passage 158, as shown, for receiving lubrication lines therethrough.

Figure 5:
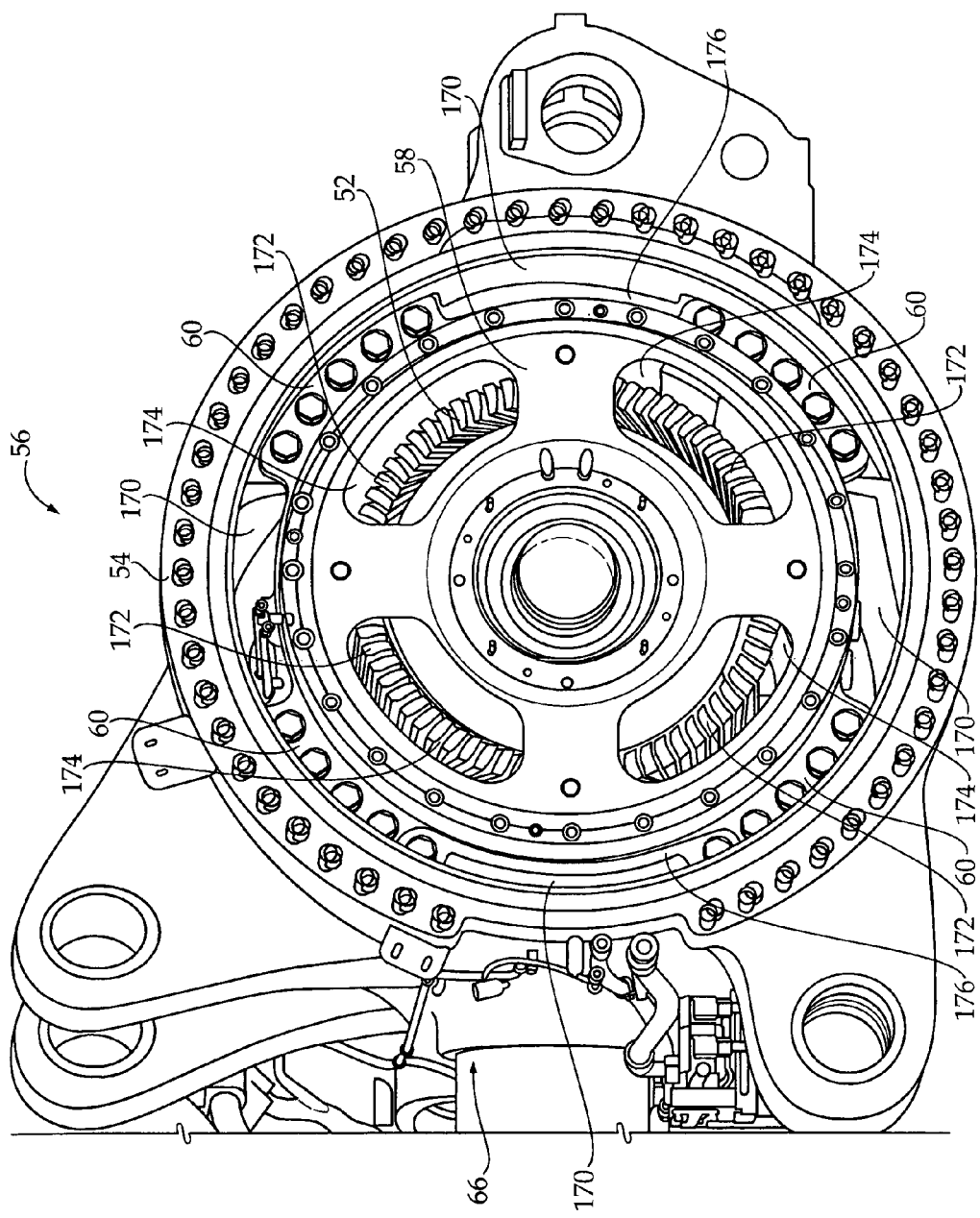
FIG. 5 is a perspective view of an end of a central axle housing of the rear axle assembly of FIG. 3, including at least one airflow restrictor plate, according to the present disclosure.

Turning now to FIG. 5, the rear axle assembly 56 is shown having the spindle 132 of FIG. 3 removed. As shown, the attachment flanges 60 that connect the motor housing 58 and the central axle housing 54, as described above, may define a plurality of passages 170. Airflow, following the airflow path 120 (FIG. 3) may, thus, be divided among the passages 170. This airflow may then be deflected by the airflow deflector 124, of FIGS. 3 and 4, and directed toward quadrants, or quadrant openings, 172 of the electric drive motor 52. More specifically, airflow may be directed through one or more openings 174 of the motor housing 58. According to one embodiment, at least one of the plurality of passages 170 may include a flow area that is restricted relative to a flow area of another of the plurality of passages 170. For example, one or more flow restrictor plates 176, made from a metal or suitable plastic, may be positioned over the passages 170 to restrict airflow therethrough. Such restriction may be desirable in an effort to equalize an amount of airflow received through each of the plurality of passages 170. It should be appreciated that such equalized airflow may enable the airflow deflector 124 to provide a more uniform distribution of airflow to the motor housing 58.

It should be appreciated that the air cooling system 62 may be designed and configured to provide adequate cooling of each component of the electric drive propulsion system 14 during an extreme operating condition of the machine 10. For example, the blower 64 may be sized and, further, may be driven at a speed and frequency for cooling each of the electrical components system 48, the electrical power generator 42, and the electric drive motors 52 during such an extreme operating condition. According to one embodiment, a control algorithm may be used to control operation of the air cooling system 62.

A controller (not shown), such as an electronic control module for the electric drive propulsion system 14, may communicate with a sensor, such as, for example, a resistance temperature detector, associated with each of the electrical components system 48, the electrical power generator 42, and the electric drive motors 52. The controller may monitor the temperatures of the respective components and ensure that the temperatures are maintained below desirable limits. If it is determined that one of the electrical components system 48, the electrical power generator 42, and the electric drive motors 52 requires cooling, the controller may initiate or alter operation of the blower 64. According to one embodiment, the blower 64 may be operated at a plurality of speeds, including, for example, a low speed and a high speed. It should be appreciated, however, that various control strategies are contemplated for use with the air cooling system 62. It should also be appreciated that numerous features and enhancements, in addition to utilization of an airflow deflector 124 and one or more flow restrictor plates 176, may be incorporated into the air cooling system 62.

INDUSTRIAL APPLICABILITY

The present disclosure finds potential application in any machine that utilizes an electric drive propulsion system. Further, the disclosure may be specifically applicable to an electric drive machine having an internal combustion engine coupled to a pair of electric drive motors via a remotely mounted electrical power generator. Yet further, the present disclosure may be applicable to electric drive propulsion systems for machines having significant cooling requirements and strict spatial constraints. Such machines may include, but are not limited to, off-highway machines, such as mining trucks, on-highway machines, such as buses and trucks, and other machines known in the art.

Referring generally to FIGS. 1-5, a machine 10 may include a frame 12 having an electric drive propulsion system 14 supported thereon for driving rear wheels 16 of the machine 10. The electric drive propulsion system 14 may include an internal combustion engine 40 that provides mechanical power to an electrical power generator 42, such as, for example, an alternator. The electrical power generator 42, in turn, may produce electrical power, such as, for example, an alternating electrical current. The frequency of the alternating electrical current may be modulated using an inverter 46 of an electrical components system 48. The electrical components system 48 may be electrically connected to a pair of electric drive motors 52 used to power the rear wheels 16 of the machine 10.

It should be appreciated that, during operation of the machine 10, the electrical power generator 42 and the electric drive motors 52, along with the electrical components system 48, may generate a significant amount of heat and, as such, may require cooling to prevent damage or even failure. An air cooling system 62, as described herein, may be used to cool each of the electrical components system 48, the electrical power generator 42, and the electric drive motors 52 using a blower 64, ductwork, and additional components described herein. Specifically, the blower 64, using a rotatable impeller powered by a hydraulic motor 74, may cool the electrical components system 48 using ambient air drawn through an inverter cabinet 50, housing the electrical components system 48, and an ambient air passage 78. This combined air may be drawn into the blower 64 through an inlet duct 76 and pressurized.

The pressurized ambient air may then travel along a first path 80 to cool the electrical power generator 42 and a second path 82 to cool the electric drive motors 52. It should be appreciated that the first path 80 may extend from the blower 64, through an intermediate duct 84, and through two diverging channels 86 and 88. The second path 82 may extend from the blower 64, through the intermediate duct 84, and through channels 102 and 104. It may be desirable to align an outlet 72 of the blower 64 with a higher resistance component, such as the electrical power generator 42, to direct a majority of airflow from the blower 64 thereto.

Within the central axle housing 54, airflow may travel along an airflow path 120 having an upstream segment 122 and a downstream segment 128. An airflow deflector 124 may be positioned within an internal space 142, defined by a spindle 132, at an intersection of the upstream segment 122 and the downstream segment 128 to deflect, or redirect, airflow to the motor housing 58. Specifically, airflow may first be directed from an opening 66 of the central axle housing 54 to the airflow deflector 124 in a first direction, such as toward a first end 126 of the central axle housing 54. Airflow may then be redirected by the airflow deflector 124 in a second direction, which may be opposite the first direction, toward the motor housing 58. Directional vanes 156 of the airflow deflector 124 may induce rotation of the airflow about an axis X during the redirection. As such, the airflow deflector 124 may provide improved cooling of the electric drive motor 52, by reducing pressure losses of the airflow that may occur without such redirection. Cooling may be further improved by restricting an airflow volume through one or more passages 170 along the airflow path 120, prior to the airflow reaching the airflow deflector 124, to equalize the amount of airflow passing through each passage 170 and toward the airflow deflector 124. As a result, the airflow may be more evenly distributed to the electric drive motor 52 by the airflow deflector 124.

The air cooling system 62 may be designed and configured to provide adequate cooling of each component of the electric drive propulsion system 14 during an extreme operating condition of the machine 10. Further, the air cooling system 62 may be operated using any know control algorithm. As such, the air cooling system 62, described herein, may provide efficient cooling of the components of the electric drive propulsion system 14 using a system occupying limited space and having reduced weight and cost. Further, the air cooling system 62 may provide improved cooling of the electric drive motors 52 by providing a more uniform distribution of airflow having reduced pressure losses.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. An electric drive machine, comprising:
    an axle assembly including a central axle housing and an electric drive motor oriented along an axis and disposed within the central axle housing, the electric drive motor including a motor housing; and
    an air cooling system including a blower fluidly connected to and positioned upstream of an opening of the central axle housing, an airflow path through the central axle housing including an upstream segment extending from the opening to an airflow deflector and configured for airflow in a first direction along an axial path, and a downstream segment extending from the airflow deflector to the motor housing and configured for airflow in a second direction, which is opposite the first direction, along a helical path;
    wherein the axle assembly further includes a spindle having an external connection to the central axle housing and an internal connection to the motor housing, wherein the airflow deflector is positioned between the internal connection and the external connection.

2. An electric drive machine, comprising
    an axle assembly including a central axle housing and an electric drive motor oriented along an axis and disposed within the central axle housing, the electric drive motor including a motor housing; and
    an air cooling system including a blower fluidly connected to and position upstream of an opening of the central axle housing, an airflow path through the central axle housing including an upstream segment extending from the opening to an airflow deflector and configured for airflow in a first direction along an axial path, and a downstream segment extending from the airflow deflector to the motor housing and configured for airflow in a second direction, which is opposite the first direction, along helical path;
    wherein the airflow deflector includes an annular body having a concave deflection surface and at least four directional vanes extending from the concave deflection surface and oriented along planes that are substantially perpendicular to the axis.

3. The electric drive machine of claim 2, wherein the upstream segment is positioned between the motor housing and the central axle housing.

4. The electric drive machine of claim 3, further including a plurality of attachment flanges connecting the motor housing and the central axle housing, and defining a plurality of passages.

5. The electric drive machine of claim 4, wherein at least one of the plurality of passages includes a flow area that is restricted relative to a flow area of an other of the plurality of passages.

6. The electric drive machine of claim 2, wherein the axle assembly further includes a spindle having an external connection to the central axle housing and an internal connection to the motor housing, wherein the airflow deflector is positioned between the internal connection and the external connection.

7. The electric drive machine of claim 2, wherein the axle assembly includes a pair of electric drive motors positioned within the central axle housing at opposing ends thereof, each of the pair of electric drive motors including a motor housing; and a pair of airflow deflectors, each of the pair of airflow deflectors positioned at one of the opposing ends of the central axle housing.

8. The electric drive machine of claim 7, wherein the blower is fluidly connected to and positioned upstream of each of the pair of electric drive motors.

9. A method of cooling an electric drive motor of an electric drive machine, comprising:
    directing an airflow through a central axle housing of the electric drive machine from an airflow inlet to an airflow deflector in a first direction along an axial path; and
    redirecting the airflow from the airflow deflector through a motor housing in a second direction, which is opposite the first direction, along a helical path; and
    wherein the airflow deflector is positioned between an external connection of a spindle to the central a housing and an internal connection of the spindle to a motor housing.

10. The method of claim 9, wherein the directing step includes dividing the airflow among a plurality of passages defined by a plurality of attachment flanges connecting the motor housing and the central axle housing.

11. The method of claim 10, wherein the directing step further includes restricting the airflow through at least one of the plurality of passages using an airflow restrictor plate.

12. The method of claim 9, wherein the redirecting step includes inducing rotation of the airflow about an axis.

13. The method of claim 9, further including directing the airflow from a blower to both the central axle housing and an electrical power generator of the electric drive machine.

14. The method of claim 13, further including directing the airflow through an airflow outlet of the central axle housing after the airflow is directed through the motor housing.

15. A method of cooling an electric drive motor of an electric drive machine, comprising:
    directing an airflow through a central axle housing of the electric drive machine from an airflow inlet to an airflow deflector in a first direction along an axial path; and
    redirecting the airflow from the airflow deflector through a motor housing in a second direction, which is opposite the first direction, along a helical path;
    wherein the redirecting step includes inducing rotation of the airflow about an axis;
    wherein the redirecting step further includes directing the airflow toward quadrant openings of the electric drive motor using at least four directional vanes extending from a concave deflection surface of the airflow deflector.

16. An airflow deflector subassembly for a cooling system of an electric drive machine, comprising:
- an annular body having a concave deflection surface and defining a central opening for receiving an axle shaft, oriented along an axis, of the electric drive machine therethrough; and
- a plurality of directional vanes extending from the concave deflection surface and oriented along planes that are substantially perpendicular to the axis.

17. The airflow deflector subassembly of claim 16, wherein the concave deflection surface is shaped to provide a 180° deflection.

18. The airflow deflector subassembly of claim 17, wherein each of at least four directional vanes are positioned to direct an airflow toward a quadrant of an electric drive motor of the electric drive machine.

19. An electric drive machine, comprising:
- an axle assembly including a central axle housing and an electric drive motor oriented along an axis and disposed within the central axle housing, the electric drive motor including a motor housing;
- an air cooling system including a blower fluidly connected to and positioned upstream of an opening of the central axle housing; and
- an airflow deflector subassembly positioned within an internal space of the axle assembly, the airflow deflector including:
  - an annular body having a concave deflection surface and defining a central opening for receiving an axle shaft, oriented along the axis, of the electric drive machine therethrough; and
  - a plurality of directional vanes extending from the concave deflection surface and oriented along planes that are substantially perpendicular to the axis.

20. The electric drive machine of claim 19, further including:
- an airflow path through the central axle housing including an upstream segment extending from the opening to the airflow deflector subassembly and configured for airflow in a first direction along an axial path, and a downstream segment extending from the airflow deflector subassembly to the motor housing and configured for airflow in a second direction, which is opposite the first direction, along a helical path.

* * * * *